2,831,054

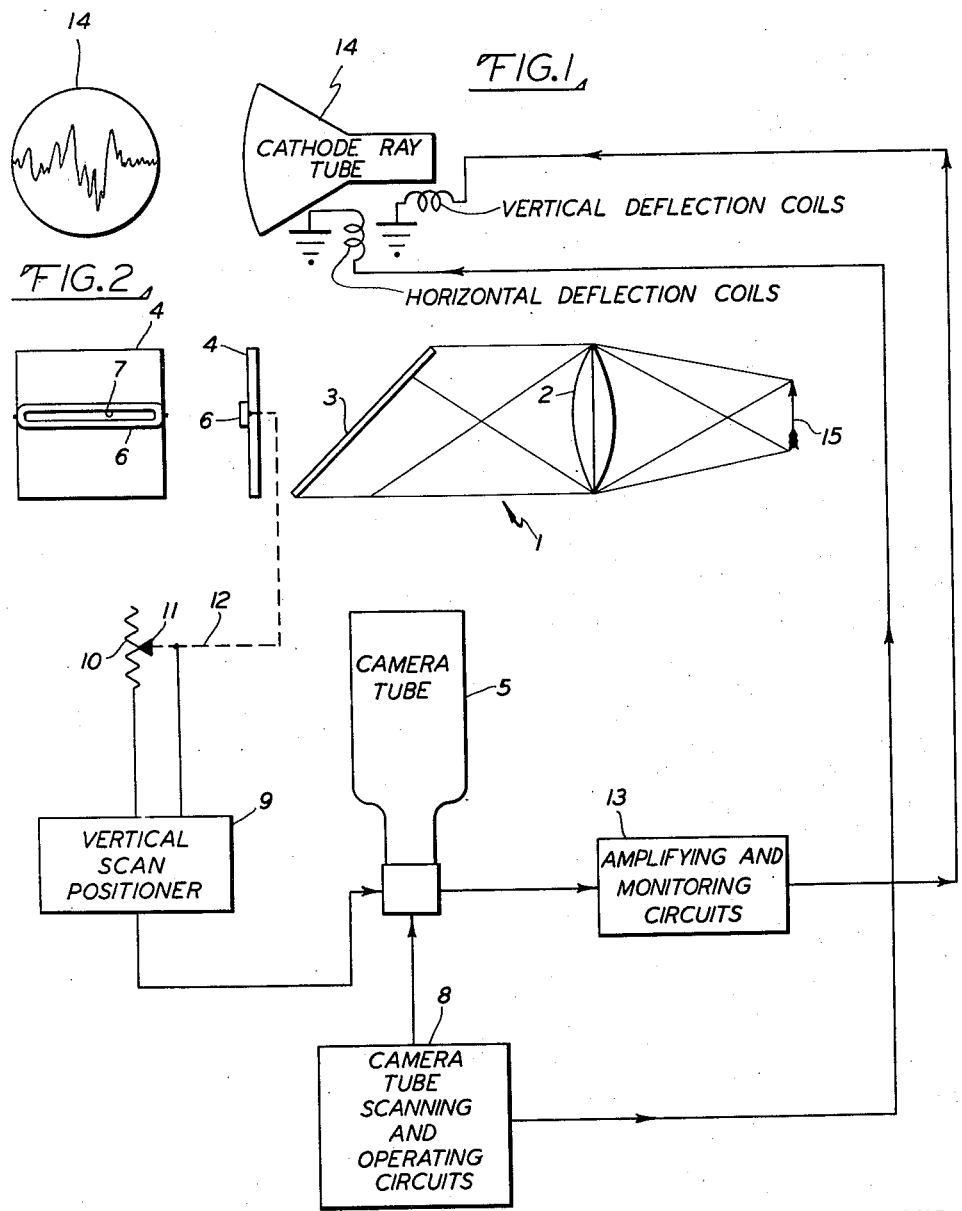

LIGHT DISTRIBUTION MEASURING SYSTEM

Samuel J. Harris, Fort Wayne, Ind., assignor to International Telephone and Telegraph Corporation Application October 12, 1953, Serial No. 385,344

5 Claims. (Cl. 178—6.8)

The present invention relates to a light distribution measuring system and more particularly to a system for measuring the brightness distribution over selected areas of a viewed scene.

In the fields of both photography and television, it is necessary to adjust the illumination on the scene to be reproduced as determined by the requirements of the particular photographic films or television systems used, respectively. Alternatively, for given light, the camera aperture may be correspondingly adjusted. In photography, particular difficulty is encountered in a situation where specular reflections from, for example, glasses or metallic objects are present. Errors in illumination of the photographed scene do not become evident until after the film is developed, and in the case of television, wherein the reproduction is instantaneous, such errors occur before they can be corrected. To assure proper illumination of the viewed scene, it is customary to make a point by point examination with a suitable light meter for each camera angle after each lighting change. Such procedure is obviously tedious and time consuming, and in the motion picture industry is extremely costly.

In view of the foregoing, it is an object of this invention to provide a light distribution measuring system for quickly ascertaining the distribution of light intensity over the area of a viewed scene.

It is another object of this invention to provide a light distribution measuring system wherein any particular elemental area of a viewed scene may be selected for the purpose of determining the distribution of light intensity thereover.

It is still another object of this invention to provide a manually operable light distribution measuring system wherein a measurement of light distribution is instantaneously obtained for any preselected elemental area of a viewed scene.

In accordance with the present invention there is provided a light distribution measuring system which comprises an optical image display means incorporating a manually operable device for selecting a particular elemental area of a viewed image to be analyzed. A television camera tube is disposed to receive the same image and is provided with means for scanning the electron beam thereof in one direction only. A beam positioning device serves to locate the area of the tube electrode scanned by the electron beam, and is operatively intercoupled with said manually operable device for varying the scanning position of the electron beam in accordance with the movement of the selecting device. Thus, the scanning position of the electron beam may be controlled to cover a preselected area of the image of the display means. The signal produced by the camera tube is then utilized by a cathode ray tube system for indicating the distribution of light over that portion of the image scanned.

For a better understanding of the invention, together with other and further objects thereof, reference is made to the following description, taken in connection with the accompanying drawing, the scope of the invention being defined by the appended claims.

In the accompanying drawing:

Figure 1 is a block diagram of one embodiment of this invention; and

Figure 2 is an elevational view of a portion of the system of Figure 1.

With reference to the drawings, an optical image display device, indicated generally by the reference numeral 1, is comprised of a lens 2, a half mirror 3 and a translucent ground glass screen 4 positioned on the side of the mirror 3 opposite the lens 2. The mirror 3 is inclined at an angle to reflect the optical image projected thereon onto the photosensitive surface of a conventional television camera tube indicated generally by the reference numeral 5. The mirror 3 is of the type which is not completely reflective, but instead transmits a portion of the optical image therethrough for projection upon the glass screen 4. This mirror 3 may be comprised of a transparent supporting plate, composed of glass, having a translucent coating of silver on one side thereof.

This optical image display device 1 is of conventional design, and is employed in certain photographic cameras wherein the view finder is so arranged as to intercept a portion of the light which is projected onto the photographic emulsion. The camera incorporating this particular view finding arrangement is commonly characterized as a reflex camera. While such a reflex optical device is disclosed as an embodiment of this invention, it will become apparent from the following description that other optical arrangements may be used without departing from the spirit of this invention.

Mounted on the screen 4 is a masking element 6 provided with an elongated aperture 7 which extends from one side of the screen to the other. The mask 6 is preferably aligned horizontally and is adjustably movable vertically on the face of the screen 4. Thus, the mask 6 may be vertically adjusted so as to make the aperture 7 coincide with a selected horizontal line portion or elemental area of an optical image cast on the screen 4.

The camera tube 5 is preferably of the dissector type, but any other type of television camera tube may be utilized as will become apparent. The tube is provided with the usual electron beam-scanning electrodes which, in the usual instance, serve to scan the electron beam simultaneously in both vertical and horizontal directions. However, in the present instance, the vertical scansion elements of the tube are disabled, thereby leaving only horizontal scanning. The vertical scanning elements, however, are statically operated for positioning vertically the horizontally scanned beam, and in an electrostatic camera tube, this change in operation is accomplished merely by applying a direct current potential to the vertical scanning deflecting plates during the application of a scanning potential to the horizontal plates. In an electromagnetic camera tube, this operation is achieved by the use of suitable D. C. currents applied to the various deflection coils. By adjusting such direct current potential, the vertical position of the horizontal scanning may be correspondingly changed. Thus, in operation, the tube 5 is caused to scan only a selected horizontal line. The importance of this feature will be explained in more detail hereinafter.

The usual necessary circuitry, represented by the block 8, is operatively coupled to the camera tube 5 and supplies the horizontal scanning signal as explained in the foregoing. A scan-positioning circuit or vertical scan positioner, as indicated by the block 9, is also operatively coupled to the tube 5 and serves to provide the necessary signal or D. C. potential for positioning the electron beam vertically. Included in this vertical scan positioner 9, is a control device 10 indicated in the present instance as being a conventional rheostat, the movable arm 11 of this rheostat having a rigid mechanical connection 12 with the mask 6. When the mask 6 is adjusted vertically on the screen 4, the arm 11 on the rheostat 10 is adjusted in unison therewith. This particular rheostat control device 10 is shown only to demonstrate a suitable working arrangement for adjusting the vertical position of the camera tube scanning beam. Any other means for adjusting the vertical position of the scanning beam will necessarily satisfy the requirements of this invention so long as the vertical positioning of the scanning beam may be manually controlled. Actually the positioner comprises essentially only a battery or similar source of D. C. signal operatively coupled to the deflection plates or coils of the camera tube. The circuit connections used will be determined by whether electrostatic or electromagnetic deflection is used.

The signal produced by the scanning beam in the tube 5 is coupled to suitable amplifying or monitoring circuits, indicated by the reference numeral 13, for driving a conventional oscilloscope cathode ray tube 14. These circuits 13 are preferably coupled to the vertical deflection elements of the tube 14 while the horizontal elements of this tube are coupled to the horizontal scanning circuits of block 8.

In operation, the scene to be viewed, indicated by the arrow 15, is focused by means of the lens 2 into the vicinity of the mirror 3. Since a portion of the image cast upon the mirror 3 is transmitted onto the screen 4, such image is visible to the operator. The mirror 3 reflects the remainder of the image onto the photosensitive surface of the tube 5.

If it is desired to measure the distribution of light across the image 15 which corresponds to the illustrated position of the mask 6, as seen in Figure 2, the vertical scan positioner 9 will serve to locate the scanning beam of the tube 5 in a corresponding position on the image screen of the latter. Thus, by proper preadjustment of the system, only that portion of the scene 15 as is transmitted by the aperture 7 of the mask 6 will be scanned by the beam of the tube 5. The signal produced by this line scansion is coupled into the monitoring circuits 13 and are reproduced by the cathode ray tube 14. If the horizontal sweep of the cathode ray tube 14 is made to correspond to the direction of sweep in the tube 5, and the vertical deflection of the tube 14 is made to correspond to the intensity of the signal produced at any instant by the scanning beam of tube 5, a wave form such as that represented in Figure 2 will be produced which corresponds to the distribution of brightness along the horizontal line of the image being analyzed. Obviously, the screen of the tube 14 may be calibrated in exposure units so that it can immediately be determined whether or not illumination of the scene 15 is proper.

In order to secure sufficient sensitivity in this system, for producing the result explained hereinabove, the horizontal scanning rate in the tube 5 is designed to be relatively slow, in the order of 10 sweeps per second. This being true, the signal produced by the tube 5 is of relatively small bandwidth as compared to the usual video signals. This small bandwidth provides, for a given light level, an improved signal to noise ratio over the usual video bandwidths, and in the instance of 10 cycles per second, will improve the signal to noise ratio by approximately thirty-nine times. The dissector camera tube with its uniform surface sensitivity and linear light response is ideal for use with the present invention. This is true since the dissector produces an output current which is directly proportional to incident light intensity. Therefore, assuming linear circuits in the monitoring system of Figure 1, the ordinate axis of the tube 14 screen may be evenly calibrated to indicate the incident light intensity projected upon the camera tube 5.

In brief summary, the camera tube 5 serves to transform a selected horizontal line segment of the viewed object from radiant energy into an electrical signal current which is utilized to operate the vertical deflection circuits in the monitoring system 13, 14.

The term "elemental area" as used throughout the description and claims is intended to mean a scanned line of any suitable length and width dimensions.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A light distribution measuring system comprising optical image display means, an image-element selecting device operatively associated with said display means for selecting a particular elemental area of an image of said display means, a camera tube having a photosensitive electrode, said tube being disposed to receive on said electrode the image of said display means, scanning means operatively associated with said tube for producing a signal corresponding to the image projected on said electrode, said scanning means being operative to scan in one direction only, scan-positioning means operatively coupled to said scanning means for selecting that portion of the photosensitive electrode desired to be scanned, control mechanism operatively intercoupling said image-element selecting device and said scan positioning means whereby the latter may be operated in response to operation of said selecting device, said selecting device thereby providing a means for causing said camera tube to scan that portion of said electrode which corresponds to said elemental image area, and monitoring means operatively coupled to said camera tube for indicating the distribution of brightness in said elemental image area.

2. A light distribution measuring system comprising optical image display means, an image-element selecting device operatively associated with said display means for selecting a particular elemental area of an image of said display means, a camera tube disposed to receive the image of said display means, scanning means operatively associated with said tube for producing a signal corresponding to said image, said scanning means being operative to scan in one direction only, scan-positioning means operatively coupled to said scanning means for selecting that portion of said image desired to be scanned, control mechanism operatively intercoupling said image-element selecting device and said scan-positioning means whereby the latter may be operated in response to operation of said selecting device, said selecting device controlling the operating position of said scanning means to correspond with said elemental image area, and monitoring means operatively coupled to said camera tube and operating in response to said signal to indicate the distribution of brightness in said elemental image area.

3. A light distribution measuring system comprising optical image display means, an image-element selecting device operatively associated with said display means for selecting a particular elemental area of an image of said display means, a camera tube disposed to receive the image of said display means and including an electron-emitting electrode, scanning means for said tube for scanning the electrons produced by said electrode, said scanning means serving to scan said electrons in one direction only and to produce a signal corresponding to the scanned portion of said tube, scan-positioning means operatively coupled to said scanning means for selecting that portion of said image desired to be scanned, control mechanism operatively intercoupling said image-element selecting device and said scan-positioning means whereby the latter may be operated in response to operation of said selecting device, said selecting device controlling the operating position of said scanning means to correspond with said elemental image area, and monitoring means operatively coupled to said camera tube and operating in response to said signal to indicate the distribution of brightness in said elemental image area.

4. A light distribution measuring system comprising optical image display means which includes a screen for reproducing an optical image, an image-element selecting device operatively associated with said display means and comprising a masking element having an elongated aperture for selecting a particular elemental area of an image on said screen for analysis, a camera tube disposed to receive the image of said display means, scanning means operatively associated with said tube for producing a signal corresponding to said image, said scanning means being operative to scan in one direction only, scan-positioning means operatively coupled to said scanning means for selecting that portion of said image desired to be scanned, control mechanism operatively intercoupling said masking element and said scan-positioning means whereby the latter may be operated in response to operation of said masking element, said masking element controlling the operating position of said scanning means to correspond with said elemental image area, and monitoring means operatively coupled to said camera tube and operative in response to said signal to indicate the distribution of brightness in said elemental image area.

5. A light distribution measuring system comprising optical image display means which includes a screen for reproducing an optical image, an image-element selecting device operatively associated with said display means and comprising a masking element having an elongated aperture for selecting a particular elemental area of an image on said screen for analysis, a camera tube disposed to receive the image of said display means and including an electron beam-forming electrode, scanning means for said tube for scanning the beam produced by said electrode over that portion of said tube which is sensitized in response to said image, said scanning means serving to scan said beam in one direction only, and to produce a signal corresponding to the scanned portion of said tube, scan-positioning means operatively coupled to said scanning means for selecting that portion of said image desired to be scanned, control mechanism operatively intercoupling said masking element and said scan-positioning means whereby the latter may be operated in response to movement of said masking element to cause said scanning means to scan said beam over that portion of said tube which corresponds to the elemental image area admitted by said masking element aperture, and monitoring means operatively coupled to said camera tube and operating in response to said signal to indicate the distribution of brightness in said elemental image area.

References Cited in the file of this patent
UNITED STATES PATENTS

| | | |
|---|---|---|
| 2,173,476 | Goldmark | Sept. 19, 1939 |
| 2,226,508 | Clothier et al. | Dec. 24, 1940 |
| 2,467,057 | Simmon | Apr. 12, 1949 |
| 2,528,977 | Simmon | Nov. 7, 1950 |
| 2,573,113 | Simmon | Oct. 30, 1951 |
| 2,578,939 | Moran | Dec. 18, 1951 |